United States Patent [19]
Herget

[11] Patent Number: 5,689,284
[45] Date of Patent: Nov. 18, 1997

[54] METHOD FOR DIRECT MANIPULATION OF IMAGES ON A MONITOR WITH A MOUSE

[75] Inventor: Martin Herget, Erlangen, Germany

[73] Assignee: Siemens Aktiengesellschaft, Munich, Germany

[21] Appl. No.: 575,594

[22] Filed: Dec. 20, 1995

[30] Foreign Application Priority Data

Dec. 23, 1994 [DE] Germany .......................... 44 46 431.2

[51] Int. Cl.$^6$ ..................................................... G09G 5/08
[52] U.S. Cl. ........................... 345/145; 345/121; 345/146
[58] Field of Search ..................................... 345/121, 123, 345/127, 129, 130, 145, 146

[56] References Cited

U.S. PATENT DOCUMENTS

| 4,586,035 | 4/1986 | Baker et al. | 345/146 |
| 5,585,821 | 12/1996 | Ishikura et al. | 345/145 |
| 5,602,596 | 2/1997 | Claussen et al. | 345/146 |

FOREIGN PATENT DOCUMENTS 0 159 400  10/1985  European Pat. Off. .

Primary Examiner—Richard Hjerpe
Assistant Examiner—Xu-Ming Wu
Attorney, Agent, or Firm—Hill, Steadman & Simpson

[57] ABSTRACT

In a method for direct manipulation of images on a computer monitor using a mouse, the image is divided on the monitor into nine regions. Dependent on the region in which a mouse cursor is located, a different function is executed by moving the mouse cursor. In the four corner regions of the image, displacement of the mouse cursor causes an enlargement or downsizing of the image dependent on the mouse displacement. If the mouse cursor is located in the central region, displacement of the cursor results in a shift of the image. If the mouse cursor is located in one of four middle edge regions, respectively disposed between the corner regions, a scrolling of the image ensues dependent on the mouse cursor displacement. In order to activate the function in each region, activation is accomplished by depressing a mouse key.

7 Claims, 2 Drawing Sheets

METHOD FOR DIRECT MANIPULATION OF IMAGES ON A MONITOR WITH A MOUSE

BACKGROUND OF THE INVENTION

1. Field of the Invention

The present invention is directed to a method for manipulating images on a computer monitor using a mouse.

2. Description Of the Prior Art

European Application 0 159 400 discloses a picture screen display on which at least one window is presented in the displayed image, the window being smaller than the area of the picture screen. Reserved areas that are not displayed during normal operation are provided at the outer edge of the window. Menu items allocated to the corresponding reserved area are displayed as soon as a cursor is moved into the reserved area. The user then selects a desired function from these menu items.

A touch-sensitive input unit is disclosed in "Issues and Techniques in Touch-Sensitive Tablet Input," Buxton, In. Computer Graphics, Vol. 19, No. 3, July 1985, pp. 215–224. The surface of this input unit can be divided into windows, with different functions being allocated to different areas of the input unit. In an exemplary embodiment for a painting program, three windows are used for setting colors and two windows are used as control knobs. A variable employment is possible with this input unit; the display of, for example, a document occurs on a separate picture screen.

In conventional displays, for example in the case of software programs which build on a windows arrangement, there is often the possibility of implementing a spatial shift of an image subject as well as undertaking an enlargement or a downsizing of the subject using a mouse. Usually, the cursor is brought into the vicinity of the image subject to be moved or modified, and a mouse key is clicked and the image subject can then be shifted in position, for example, by moving the mouse with the key remaining depressed (dragging). An enlargement or downsizing is also possible, wherein a rectangular frame is imaged around the subject and this rectangle is changed in size using the mouse, also by dragging. The image is enlarged or downsized. There is also usually the option of setting a zoom factor for the image subject by means of numerical entries.

A scrolling of images is also possible in some programs, i.e., those portions of the image which extend beyond the physical limitations of the picture screen display are moved into the displayed image by calling a next image page.

The aforementioned functions are also of significance in the image display used in various computerized medical examination systems. For example, the software Numaris, used for the operation of the Magnetom® magnetic resonance imaging apparatus manufactured by Siemens AG, exhibits the above-discussed possibilities for image manipulation. The individual functions are offered to the user as independent control windows to which the user must gain access via a main menu. All functions therefore do not cooperate with one another, for example enlarged images cannot be subsequently scrolled, but can be shifted. Only enlarged images can be shifted by dragging with the mouse key depressed. The picture screen area in which the dragged image (segment) is present always remains completely covered by parts of the original image, because further dragging is ignored as soon as the mouse cursor leaves this segment.

The function of enlargement/downsizing is achieved in this known software by the use of a rectangle which represents the later image excerpt, the rectangle being drawn into the image to be manipulated. This rectangle can be changed in size and also can be shifted by dragging. Alternatively, an enlargement factor or scaling factor can be set by means of numerical entries. The image is shown enlarged by means of a double click with the cursor located in the segment, or by actuation of a dedicated key. Since the rectangle must always be smaller than the displayed image, the original image must be shown in an intermediate step given a change of the scaling factor in order to proceed as set forth above.

The scrolling of images also ensues by dragging in this known software, i.e., the portions of the image proceeding beyond the edge of the displayed segment are brought into the display by paging. The paging direction is determined by a selection switch in the display. This function is interrupted as soon as the mouse pointer reaches the edge of the segment, however, the pointer does not cross this edge.

SUMMARY OF THE INVENTION

It is an object of the present invention to provide a method for enlarging, downsizing, shifting and scrolling displayed images of a computer system uniformly and effectively.

The above object is achieved in accordance with the principles of the present invention in a method wherein the image displayed on a monitor is divided into nine regions: four corner regions lying at the respective corners if the image, four middle edge regions each disposed between two of the corner regions, and a central region disposed inside the four corner regions and the four middle edge regions. When a mouse cursor is located in one of the four corner regions, a displacement of the mouse cursor results, after activation, to an enlargement or a downsizing of the image corresponding to the movement of the mouse cursor. When the mouse cursor is located in the central region, a displacement of the mouse cursor results, after activation, in a shift of the image corresponding to the movement of the mouse cursor. When the mouse cursor is located in one of the four middle edge regions, a displacement of the mouse cursor results, after activation, in a scrolling of the image corresponding to the movement of the mouse cursor.

The regions in the image can be demarcated from one other by visible lines which can be mixed into the image. This mixing can ensue as soon as any conditions which are necessary for conducting an image manipulation had been satisfied, and the lines can be blanked out as soon as one of the above functions is activated. Activation can be accomplished, for example, by depressing a key on the mouse.

The mouse cursor can assume different forms on the display, such as a "normal" form when none of the above functions has been activated, and being changed to respectively different forms dependent on the particular function which has been activated when the cursor is in a given region.

DESCRIPTION OF THE PREFERRED EMBODIMENTS

Figure 1:
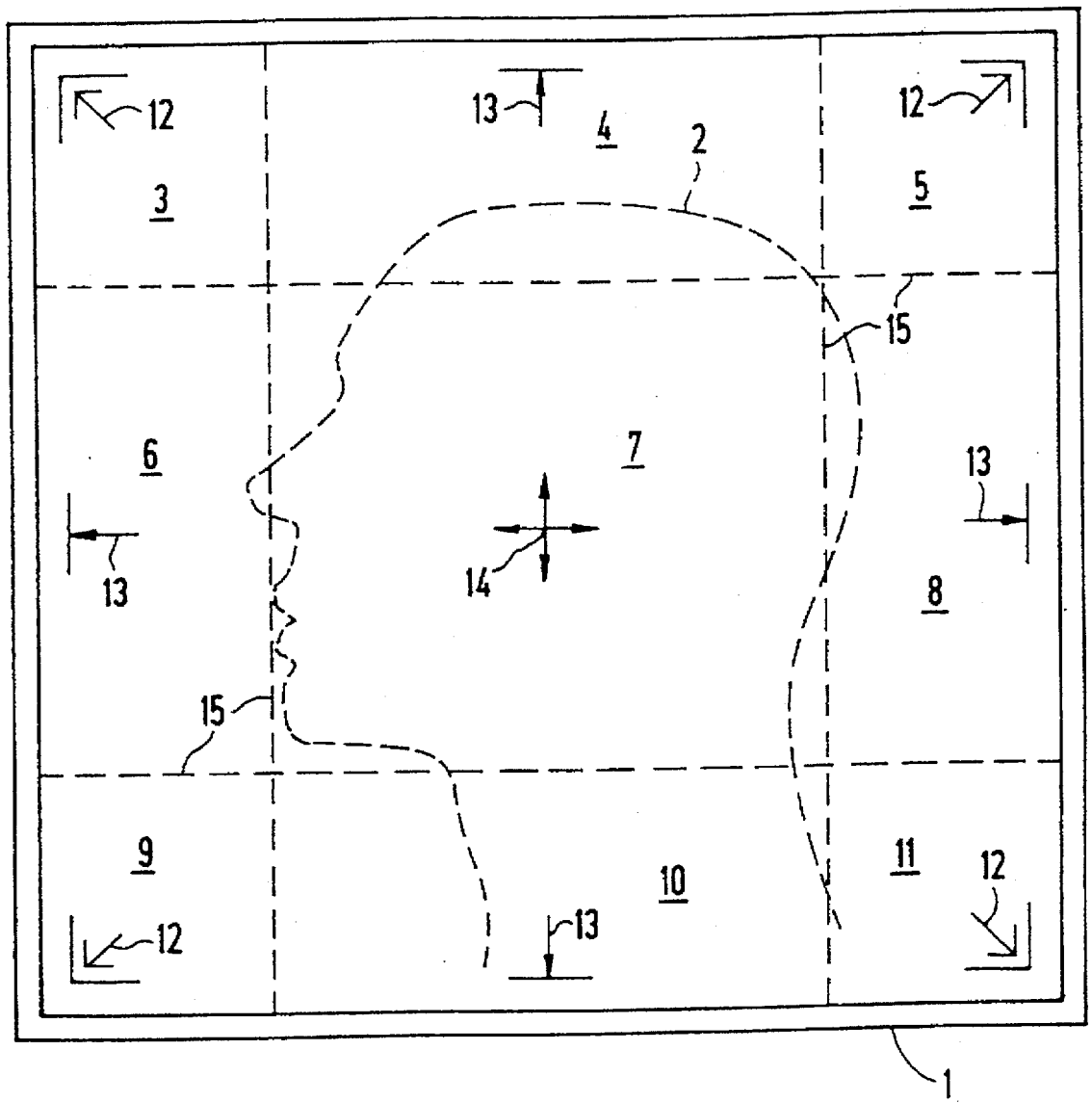
FIG. 1 is a schematic illustration of a displayed image divided into different regions and showing different forms of the mouse cursor, for explaining the method of the invention, FIG. 2 schematically illustrates different possibilities for image manipulation, in accordance with the method of the invention.

FIG. 1 schematically illustrates a computer monitor 1 on which an image 2 is displayed, this image being, for exemplary purposes, an image of a human skull produced with a tomographic technique. The image area coextensive with the displayed image is divided into nine regions 3 through 11. All of the regions 3 through 11 are rectangular and are contiguously arranged. The regions 3 through 11 are demarcated from each other by lines 15 which are visible on the displayed image. The lines 15 are mixed into the image as needed, i.e., as soon as any pre-conditions are satisfied for permitting the image to be manipulated. This ensues, for example, by clicking onto the image with a mouse key.

A specific function for image manipulation using the mouse is allocated to each of the regions 3 through 11. When the mouse cursor is located in one of the corner regions 3, 5, 9 or 11, an enlargement or downsizing of the overall image 2 can be implemented. When the mouse cursor is located in the central region 7, the overall image 2 can be shifted in position. When the mouse cursor is located in one of the middle edge regions 4, 6, 8 or 10, a scrolling of the overall image 2 can ensue. The operation of each of these functions always ensues according to the same principle: when dragging with the mouse cursor, the pixel lying beneath the mouse cursor at the beginning of the manipulation follows the movement of the mouse cursor. During shifting, all displayable pixels are therefore shifted relative to the mouse cursor. This is also true when scrolling, with the difference that the pixels which are "pushed" beyond the physical edges of the screen are not "invisible" but are moved onto a next page.

For facilitating operation, a specific form (appearance) of the mouse cursor is allocated to each region, as soon as the function pertaining to that region is activated. FIG. 1 shows examples of such mouse cursors, namely a mouse cursor 12 in the regions 3, 5, 9 and 11 for enlargement/downsizing, a mouse cursor 13 in the regions 4, 6, 8 and 10 for scrolling, and a mouse cursor 14 in the region 7 for shifting the image 2. The activated function, as well as the form of the mouse cursor allocated to this function, are retained until the end of the dragging, even if the mouse cursor moves out of the initial region to which the function is allocated.

Figure 2:
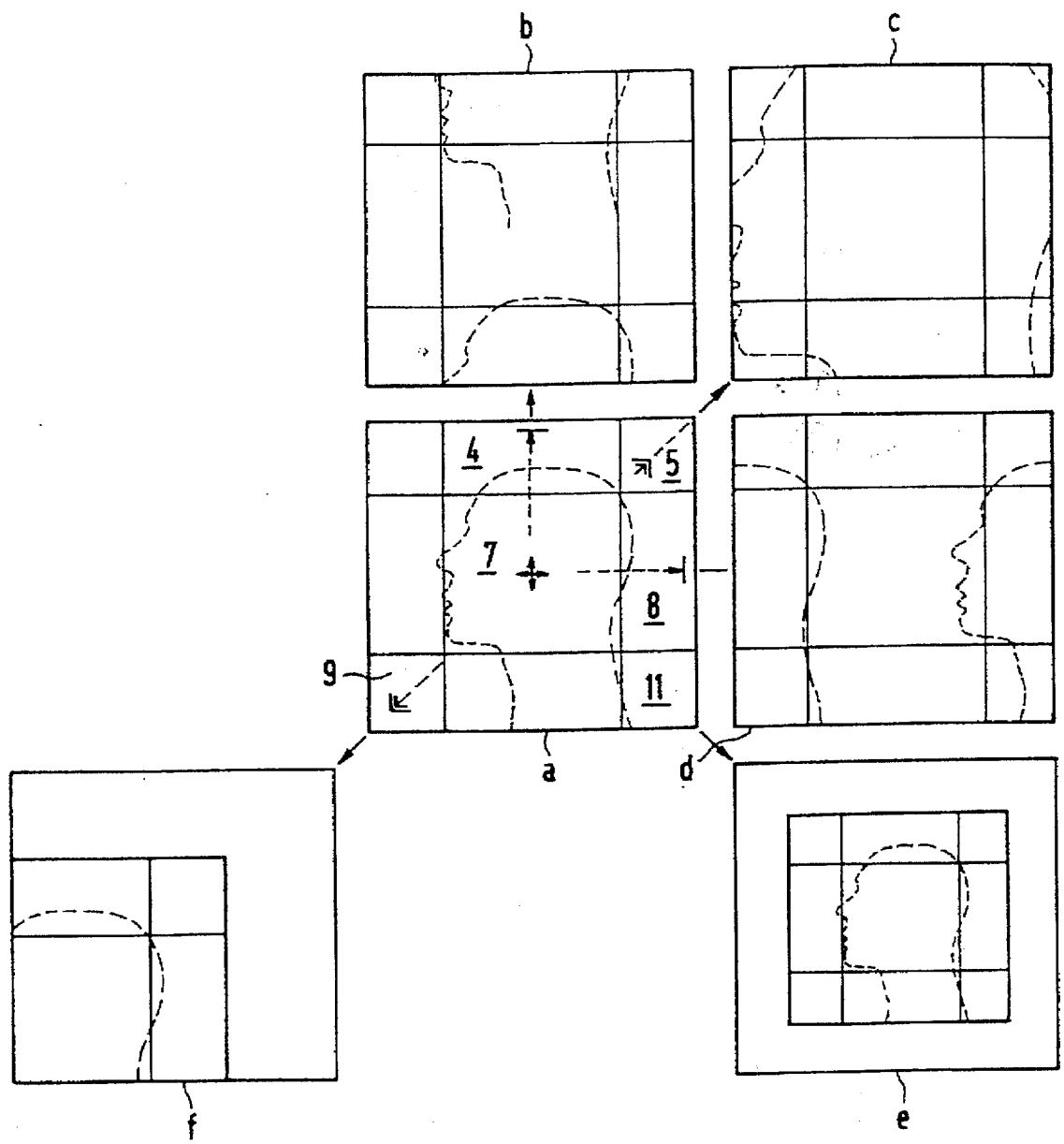

FIG. 2 schematically illustrates the effects of the different possibilities for image manipulation in accordance with the method. For clarity, the lines which demarcate individual regions from one another are shown, even though these lines are, in practice, mixed into the image only at the beginning of the procedure.

Proceeding from the original image a, vertical scrolling, resulting in the image display b is conducted by clicking onto the region 4 and dragging in the direction indicated by the dashed lines. Analogously, the image display d results by clicking onto the region 8 and conducting a corresponding dragging. The image displays c and e are respectively obtained by clicking onto regions 5 or 11, and subsequent dragging. Lastly, the image display f is obtained by clicking in the region 7 and shifting in the direction indicated with the dashed lines.

In the method of the invention, therefore, independent functions are combined by various regions in the image.

Them is a uniform mental model for the functions of shift, scroll and enlarge/downsize. Complete operation is possible with a mouse. The inventive method is therefore very user-friendly.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for direct manipulation of images on a computer monitor with a mouse, comprising the steps of:

dividing an image displayed on a monitor into nine regions, including four corner regions respectively disposed at corners of the displayed image, four middle edge regions respectively disposed between said corner regions, and a central region disposed inside said corner regions and said middle edge regions;

displaying a mouse cursor in one of said nine regions;

when said mouse cursor is located in one of said four corner regions and when said mouse cursor is displaced, downsizing or enlarging said image after activation corresponding to displacement of said mouse cursor;

when said mouse cursor is located in said central region and when said mouse cursor is displaced, shifting a position of said displayed image, after activation, corresponding to displacement of said mouse cursor; and when said mouse cursor is located in one of said four middle edge regions and when said mouse cursor is displaced, scrolling said displayed image, after activation, corresponding to displacement of said mouse cursor.

2. A method as claimed in claim 1 wherein the step of dividing said displayed image into nine regions comprises dividing said displayed image into nine contiguous regions.

3. A method as claimed in claim 1 wherein the step of dividing said displayed image into nine regions comprises mixing visible lines into said displayed image dividing said displayed image into nine regions.

4. A method as claimed in claim 3 comprising mixing said lines into said image as soon as image manipulation is able to be conducted.

5. A method as claimed in claim 4 comprising the additional step of blanking out said lines when an activation occurs.

6. A method as claimed in claim 1 comprising the step of causing activation by depressing a key of said mouse.

7. A method as claimed in claim 1 wherein the step of displaying the mouse cursor comprises displaying said mouse cursor in a respectively different form, upon activation, dependent on which of said regions in which said cursor is located at the time of activation.

* * * * *